(12) United States Patent
Tillman

(10) Patent No.: US 6,578,885 B1
(45) Date of Patent: Jun. 17, 2003

(54) REMOTELY OPERATED RELEASE DEVICE

(76) Inventor: Jerry R. Tillman, 2796 Richmond Rd., Beachwood, OH (US) 44122

( * ) Notice: Subject to any disclaimer, the term of this patent is extended or adjusted under 35 U.S.C. 154(b) by 0 days.

(21) Appl. No.: 10/006,573

(22) Filed: Dec. 2, 2001

(51) Int. Cl.⁷ .................................................. E05C 3/06
(52) U.S. Cl. ........................ 292/201; 292/11; 292/24; 292/25; 292/56; 292/95; 54/1; 119/772
(58) Field of Search .............................. 292/201, 11, 24, 292/25, 56, 95, 30, 26, 53, 48, 119; 119/776, 772, 859; 54/1

(56) References Cited

U.S. PATENT DOCUMENTS

| | | | |
|---|---|---|---|
| 602,569 A | * 4/1898 | Turner | .......................... 267/74 |
| 621,574 A | * 3/1899 | Kinsey | .......................... 292/24 |
| 1,190,383 A | 7/1916 | Court | |
| 1,238,152 A | * 8/1917 | Kelloniemi | ..................... 70/98 |
| 1,536,268 A | * 5/1925 | Rasmussen | .................. 292/25 |
| 1,574,023 A | * 2/1926 | Crompton et al. | ............ 292/24 |
| 2,328,914 A | 9/1943 | Kubal | |
| 2,608,812 A | 9/1952 | Hutchings | |
| 2,821,003 A | 1/1958 | Boyes et al. | |
| 3,215,912 A | * 11/1965 | Bruno | .......................... 318/16 |
| 3,505,979 A | * 4/1970 | Rosswag | ..................... 119/772 |
| 3,616,595 A | 11/1971 | Townsend | |
| 3,733,530 A | 5/1973 | Labart et al. | |
| 3,771,823 A | * 11/1973 | Schnarr | ....................... 292/270 |
| 4,199,921 A | * 4/1980 | Watkins | ......................... 54/71 |
| 4,906,658 A | 3/1990 | Townsend | |
| 5,534,852 A | * 7/1996 | Schuett et al. | .............. 340/573 |
| 5,771,668 A | 6/1998 | Younger | |
| 6,044,801 A | * 4/2000 | Chavez | ......................... 11/805 |

* cited by examiner

Primary Examiner—J. J. Swann
Assistant Examiner—Carlos Lugo
(74) Attorney, Agent, or Firm—Fay, Sharpe, Fagan, Minnich & McKee

(57) ABSTRACT

A remotely operated bull rope release comprises a support, a releasable member having a spherical head and a remotely controlled release mechanism for releasing the end of the releasable member for separation from the support. The release mechanism includes a pair of gripping members pivotally mounted on the support on laterally opposite sides of the spherical head for displacement toward and away from the head and having spherical surfaces for capturing the head therebetween to hold the releasable member on the support. A latched, spring biased drive shaft is actuated to displace the gripping members in response to a control signal to release the head and to propel the releasable member away from the support.

31 Claims, 4 Drawing Sheets

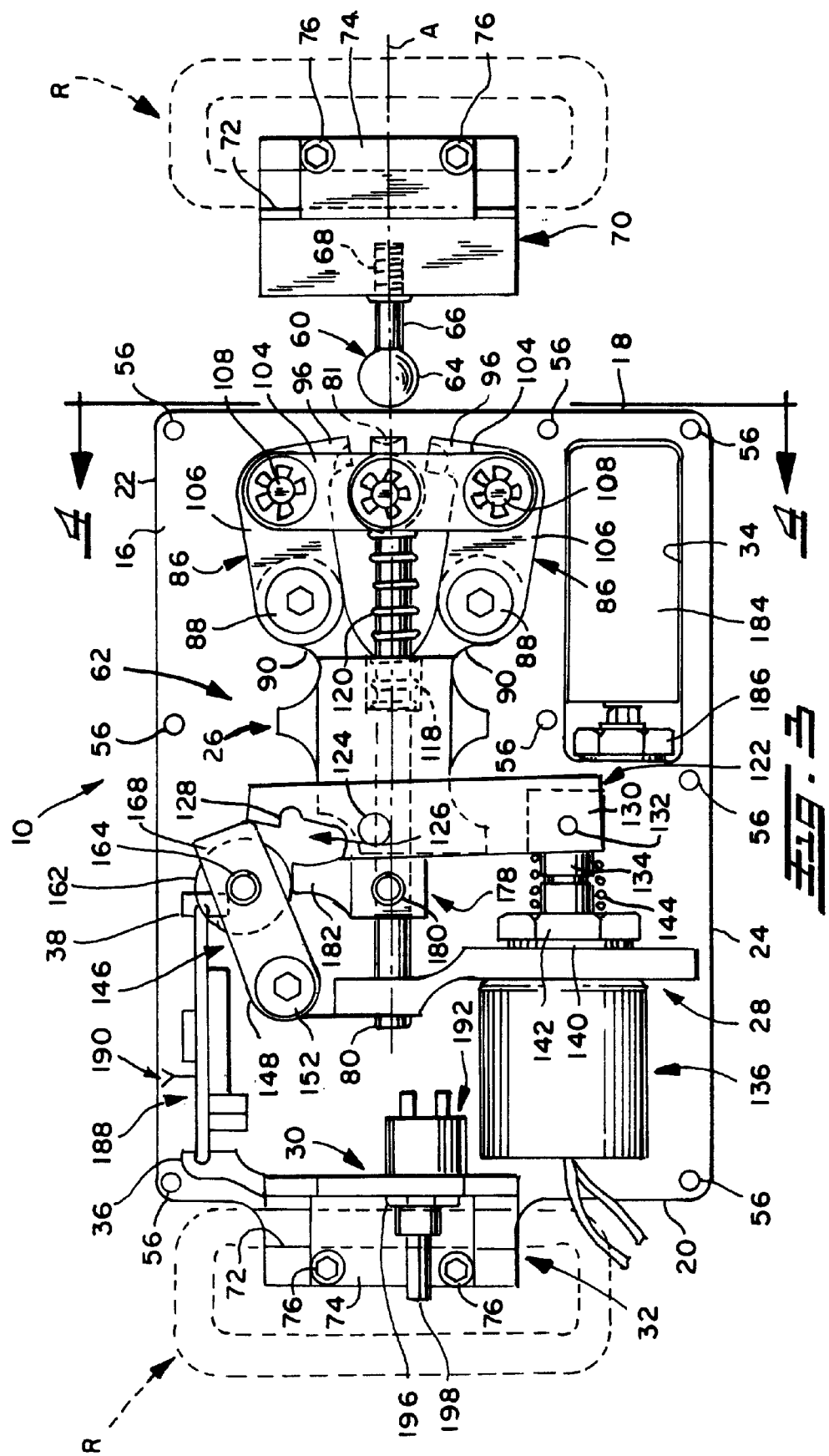

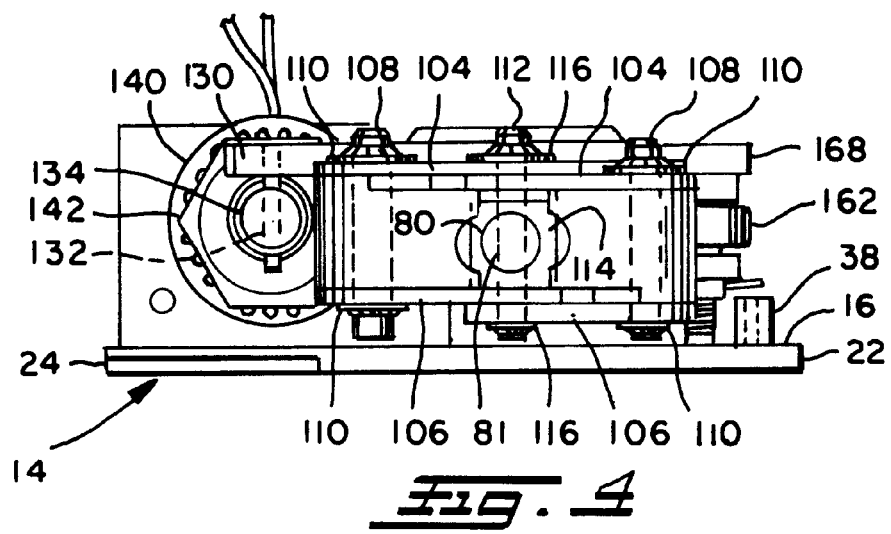
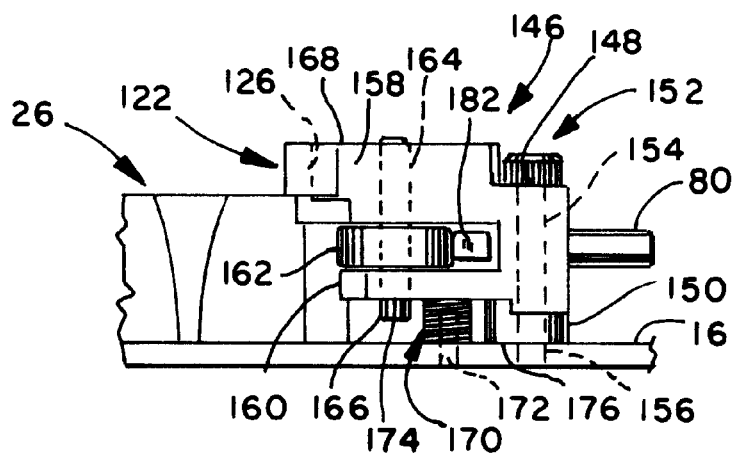
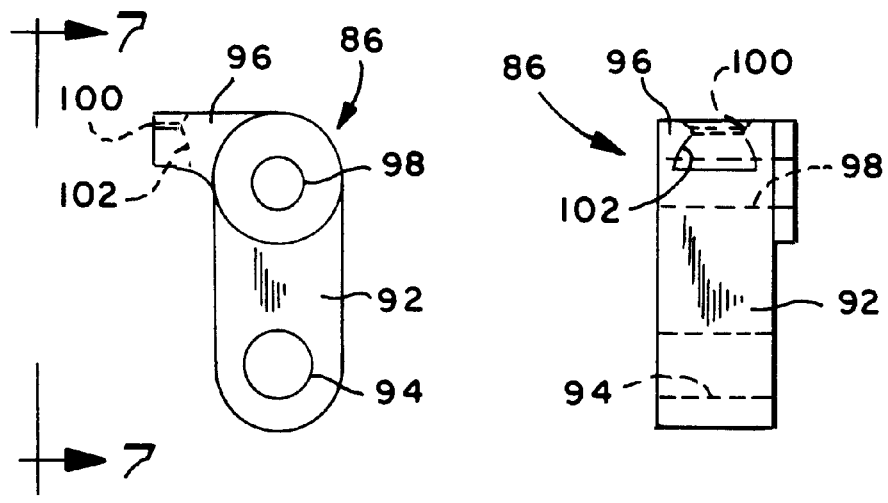

REMOTELY OPERATED RELEASE DEVICE

BACKGROUND OF THE INVENTION

This invention relates to the art of selectively operable release devices and, more particularly, to improvements in such devices which are remotely operated.

The present invention finds particular utility in connection with remotely controlling the release of a bull rope from a bull such as during a bull riding contest at a rodeo. Accordingly, the invention will be disclosed and described in detail in connection with such a release device. At the same time, it will be appreciated that the device can be used for selectively and remotely releasing components other than a bull rope such as, for example, the flank strap applied around the flank of a horse in connection with a bucking contest in a rodeo, a parachute release, and the like.

The present invention relates in particular to improvements in a remotely controlled or operable bull rope release device of the character disclosed in patent 5,771,668 to Younger, the disclosure of which is incorporated herein by reference for purposes of background information. As is well known, in a bull riding contest at a rodeo a bull is trained to buck while a rider attempts to remain on the bull for a specified period of time. The rider holds onto the bull with one hand through the use of a bull rope or strap which can be wrapped around the chest of the bull immediately behind the front legs. Typically, in the absence of the use of a release device, a bull rider wraps the bull rope or strap around the chest of the bull and inserts one end of the bull rope through a loop fastened to the other end and the rider then pulls the rope to tightly secure the rope to the bull. The free end of the rope or strap is then wrapped tightly around the rider's hand, and when the rider is thrown from the bull, or the specified time period has expired, the rider will attempt to let go of the rope in order to dismount from the bull. Occasionally, when a rider is thrown from the bull, a rider's hand remains secured to the bull rope because of the tight grip caused by wrapping the rope about the rider's hands. When this happens, the rider may be dragged by the bull, stepped on, kicked, and/or otherwise injured. In any event, the bull rider is basically helpless until a rodeo clown or other person is able to unwind the rope from the rider's hand.

One effort to avoid such potential injury to a bull rider is disclosed in the aforementioned patent to Younger and comprises a remotely controlled release device in which one end of the bull rope is fixedly attached to a housing and the other end is secured to a member which is releasable from the housing in response to a signal transmitted to a receiver in the housing from a remotely located transmitter controlled by a person such as a rodeo clown. In response to the signal from the transmitter, the receiver actuates a servo mechanism which releases the releasable member. Accordingly, the bull rope is released from the bull, whereby the rider, whether dismounting or being thrown from the bull, is completely separated therefrom and cannot be dragged by the bull.

While the Younger device is operable to release a bull rope, there are a number of disadvantages attendant to its manufacture, structure and use. In this respect, for example, the interconnecting pivotal latch finger and slot arrangement for holding the releasable member in the housing often, due to the pulling stress on the bull rope during use, does not disengage to release the releasable member in response to the control signal from the transmitter. It will be appreciated of course that reliability in operation is of extreme importance for the safety of the rider. Further, the structural complexity of the servo mechanism by which the latch finger is displaced relative to the slot not only lends to the unreliability with regard to separating the latch finger from the slot but also is slower than desired in doing so when release of the releasable member is achieved. Moreover, reloading the device following use is difficult in that the end of the releasable member introduced into the housing has to laterally pivot the latch finger out of the path of the end in order to re-engage the finger and slot, and the lateral displacement of the finger requires excessive axial force on the releasable member. Still further, the device is undesirably large as a result of the structural complexity and arrangement of the component parts in the housing, and production and maintenance costs are undesirably high as a result of the structural complexity.

A radio controlled bucking strap release mechanism is disclosed in patent 3,733,530 to Labart, et al. As is well known, a bucking strap is applied to a horse or bull in the flank area thereof to cause the animal to buck more actively, such as in a bucking contest at a rodeo. The bucking strap is not gripped by the rider, and the purpose of the radio operated release is to disconnect the bucking strap and thus caine the animal so that it will stop bucking. Accordingly, the device does not help a rider release his hands from the bull rope. Moreover, the release mechanism in Labart, et al. includes a motor, gear and lost motion linkage arrangement which would render the mechanism undesirably slow in operation. Furthermore, the releasable member is held in place in the mechanism by a lateral force against one side thereof which forces the member against a fixed surface on the opposite side thereof. Such an unbalanced holding force could interfere with separation of the releasable member from the housing of the mechanism, thus rendering the mechanism unreliable in operation.

SUMMARY OF THE INVENTION

In accordance with the present invention, a remotely operated release device is provided which minimizes and/or overcomes the foregoing and other disadvantages of prior art release mechanisms. More particularly in this respect, a release mechanism in accordance with one aspect of the present invention comprises a releasable member having an end releasably interengaged with a latching mechanism comprising a pair of gripping members mounted on laterally opposite sides of the releasable member for movement toward and away from the end between first and second positions in which the gripping members respectively hold and release the releasable member. The lateral displacement of the gripping members away from the end of the releasable member advantageously minimizes the area of interengagement between the gripping members and the end of the releasable member, thus optimizing reliability with respect to release of the releasable member in response to a control signal from the remotely operated transmitter. Preferably, the end of the releasable member is a spherical head and the gripping members have spherical surfaces of corresponding contour which capture the head therebetween, and the gripping members are pivotal laterally outwardly of the head, thus further promoting reliability in connection with releasing the releasable member.

In accordance with another aspect of the invention, the release mechanism includes solenoid operated lever components providing a latching arrangement with respect to a spring driven shaft which both displaces the gripping members to the released position thereof and propels the releasable member from the release mechanism. The release mechanism also includes a linkage arrangement between the shaft and gripping members which assures positive displacement thereof to release the releasable member. The lever and link arrangement advantageously enables a low profile for the release device transverse to the direction of lateral displacement of the gripping members, and the lever and link components and drive shaft are structurally and operatively interconnected so as to promote reliability in operation. Advantageously, reloading the releasable member after use is achieved without having to overcome any forces against the member other than the force of the shaft spring, and the latter is overcome by a strictly axial force of the releasable member against the shaft. Still further, the component parts are structurally simple, easily accessible for inspection and/or maintenance and/or replacement of parts and, preferably, are constructed of stainless steel and an aluminum alloy for durability and protection against rusting. All of the latter attributes lend to minimizing both manufacturing and maintenance costs.

It is accordingly an outstanding object of the present invention to provide an improved remotely operated release device of the character having a releasable member which is separable from the device upon receipt of a control signal from a remotely operated signal transmitter.

Another object is the provision of a release device of the foregoing character having improved dependability and reliability in operation in comparison with similar remotely operated release devices heretofore available.

A further object is the provision of a release device of the foregoing character which comprises a releasable member and a pair of gripping members on laterally opposite sides thereof and displaceable toward and away from an end of the releasable member respectively between holding and released positions relative to the releasable member and which gripping members and end promote reliability and dependability with respect to disengaging and releasing the releasable member.

Yet a further object of the invention is the provision of a release device of the foregoing character including a release mechanism which is more dependable and reliable in operation for releasing the releasable member and which is easier to reload following use than the release devices heretofore available.

Still a further object is the provision of a release device of the foregoing character in which the release mechanism comprises a drive shaft for displacing the gripping members to the released positions thereof and a latching arrangement for controlling release of the shaft in response to a control signal from a remotely located transmitter.

Still another object is the provision of a release device of the foregoing character comprising a releasable member having a spherical head, a pair of pivotal gripping members on laterally opposite sides of the head and having spherical surfaces of corresponding contour for engaging and disengaging therewith, and a spring biased drive shaft having a latched position in which the gripping members capture the head therebetween to hold the releasable member in place in the device and a released position in which the spring biases the shaft to displace the gripping members away from the head of the releasable member and to propel the releasable member away from the release mechanism.

DESCRIPTION OF THE DESCRIPTION

The foregoing objects, and others, will in part be obvious and in part pointed out more fully hereinafter in conjunction with the written description of a preferred embodiment of the invention illustrated in the accompanying drawings in which:

FIG. 3 is a plan view of the base and the component parts of the release mechanism shown in the released condition thereof;

FIG. 4 is an end elevation view looking in the direction of FIG. 4—4 in FIG. 3;

FIG. 5 is a side elevation view looking in the direction of line 5—5 in FIG. 2;

FIG. 6 is a plan view of a gripping finger of the release mechanism; and,

FIG. 7 is a side elevation view of the gripping finger taken along lines 7—7 in FIG. 6.

DESCRIPTION OF A PREFERRED EMBODIMENT

Figure 1:
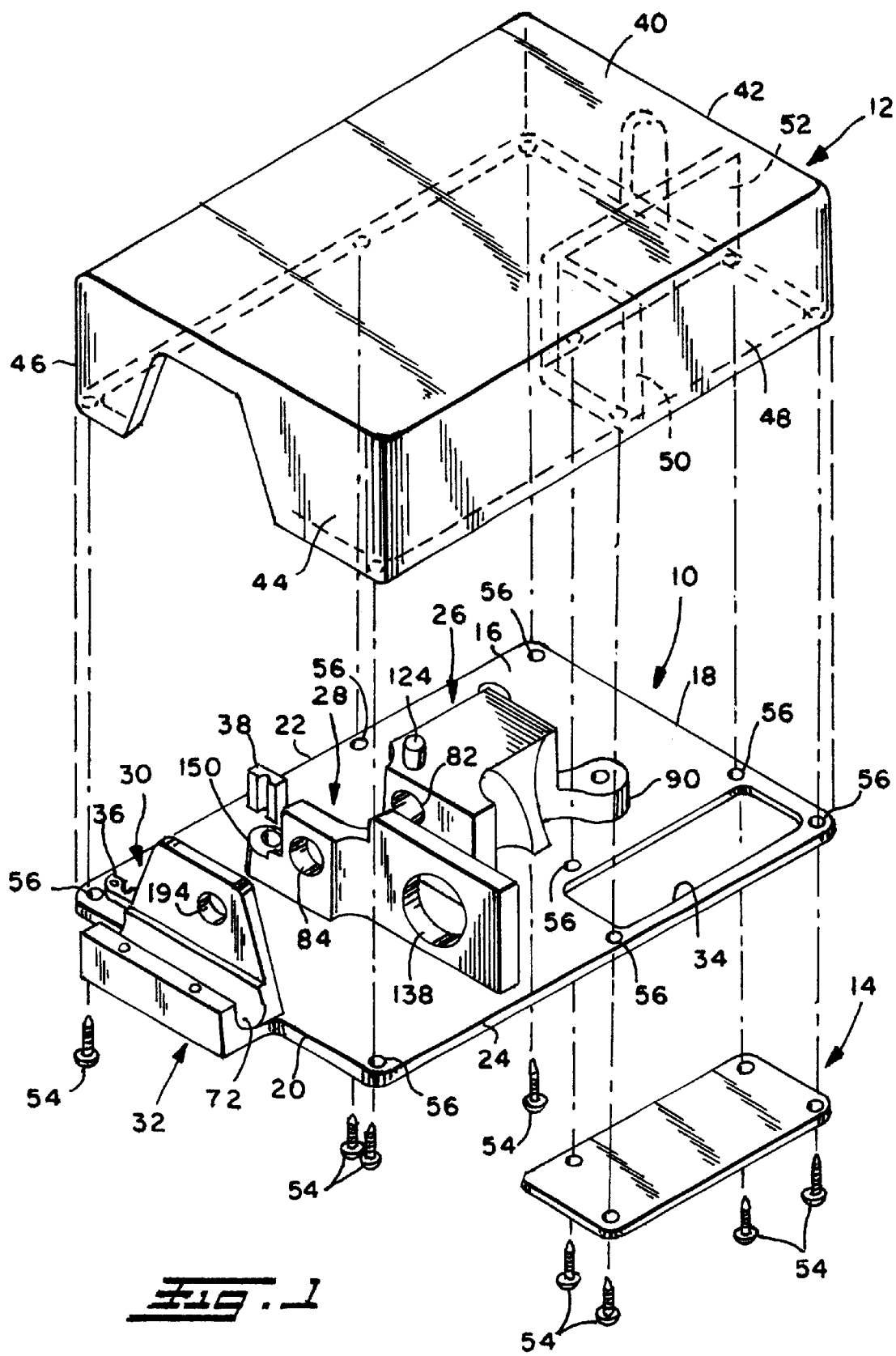
FIG. 1 is an exploded perspective view of the base and cover components of a remotely operated release device according to the present invention.

Referring now in greater detail to the drawings wherein the showings are for the purpose of illustrating a preferred embodiment of the invention only and not for the purpose of limiting the invention, a remotely operated release device in accordance with the present invention includes a housing comprising a base 10 which supports the component parts of the device as set forth more fully hereinafter, a cover 12 for the base, and a cover 14 for a battery compartment in the housing. The device further includes a hand held transmitter T for remotely operating the release device as set forth hereinafter. Base 10 is preferably an aluminum alloy casting and comprises a plate 16 which provides the bottom of the housing and which has front and rear ends 18 and 20, respectively, and opposite sides 22 and 24 between ends 18 and 20. A shaft, gripping finger and locking arm mounting block 26 extend upwardly from plate 16 inwardly of front end 18 thereof, and a shaft, solenoid and locking arm support 28 extend upwardly from plate 16 between support 26 and rear end 20 of the plate. A switch mounting plate 30 extends upwardly from plate 16 at rear end 20 thereof, and the base further includes a rearwardly extending mounting component 32 for fixedly securing one end of a bull rope or strap to the housing through the use of a D-ring R as shown in phantom in FIGS. 2 and 3 of the drawing. Base plate 16 has a rectangular opening 34 therethrough adjacent the corner between front end 18 and side 24 and which opening is normally closed by battery cover 14, and a pair of receiver supporting fingers 36 and 38 extend upwardly from plate 16 inwardly adjacent side 22 of the base adjacent end 20 thereof.

Cover 12 comprises a top wall 40, front and rear walls 42 and 44, respectively, and opposite side walls 46 and 48. The cover is preferably made of Lexan plastic, and the end walls and side walls are adapted to overlie the corresponding edges of base plate 16 when the cover is in its mounted position. Cover 12 further includes interior walls 50 and 52 which, together with portions of walls 42 and 48 provide a battery compartment in the housing which is accessible by removing battery cover 14 from base 10. When cover 12 is in its mounted position on base 10, it is adapted to be removably interconnected therewith by a plurality of threaded fasteners 54 which extend through openings 56 and base plate 16 and into corresponding openings therefor, not shown, which are provided in cover 12.

As best seen in FIGS. 2–5, taken in conjunction with FIG. 1, the remotely controlled release device comprises a releasable member 60 and a release mechanism 62 by which releasable member 60 is adapted to be secured to and released from the housing of the device. In the embodiment disclosed, releasable member 60 is of stainless steel and includes a spherical head 64 and a threaded stem 66 received in a threaded bore 68 provided in a D-ring mounting block 70 of stainless steel. Mounting block 70 and mounting component 32 on base 10 are each provided with a laterally extending channel 72 for receiving a corresponding D-ring R, and each D-ring is pivotally captured in the corresponding channel by a stainless steel cover plate 74, which is removably secured to the corresponding one of the mounting component 32 and mounting block 70 by threaded fasteners 76. Releasable member 60 is engaged with and released from release mechanism 62 in the manner set forth more fully hereinafter.

Release mechanism 62 comprises a stainless steel shaft 80 which is slidably supported in openings 82 and 84 provided therefor in mounting block 26 and support 28, respectively. Shaft 80 has an axis A which provides an axis for base 10, and the forward end of the shaft has a spherical recess 81 therein for the purpose which will become apparent hereinafter and which conforms in contour to spherical head 64. A pair of stainless steel gripping members 86 is mounted on laterally opposite sides of shaft 80 adjacent front end 18 of base 10 by corresponding pivot pins 88 having threaded lower ends received in threaded openings therefor in mounting arms 90 of mounting block 26. As best seen in FIGS. 4, 6 and 7, each of the gripping members is generally L-shaped and comprises a mounting leg 92 having an opening 94 therethrough for receiving the corresponding pivot pin 88, and a gripping finger 96 extending laterally inwardly of leg 92 at the opposite ends thereof. An opening 98 extends through the juncture between leg 92 and finger 96 for the purpose set forth hereinafter, and the laterally inner end of finger 96 is provided with an arcuate opening 100 and a spherical recess 102. Recesses 102 face shaft 80 for the purpose set forth hereinafter and conform in contour to spherical head 64 of releasable member 60. Gripping members 86 are interconnected with one another and with shaft 80 by a pair of upper links 104 and a pair of lower links 106. More particularly in this respect, the outer ends of each link 104 and the corresponding link 106 therebeneath are pivotally interconnected with the corresponding gripping member 86 by a pivot pin 108 extending through opening 98 in member 86 and openings therefore in links 104 and 106, not designated numerically, and the links and gripping member are retained in assembled relationship by lock washers 110 on the upper and lower ends of pin 108. The outer ends of links 104 and 106 associated with the other of the gripping members 86 are pivotally interconnected in the same manner. The laterally inner ends of links 104 overlap, as do the laterally inner ends of links 106, and the inner ends of the pairs of links are pivotally interconnected with shaft 80 by means of a pivot pin 112 extending through openings therefor in the links and shaft 80 and a spacing block 114 on the shaft. The links, shaft and spacing block are maintained in assembled relationship by block washers 116 on opposite ends of pin 112.

As will be appreciated from the description thus far, and as will become more apparent hereinafter, displacement of shaft 80 in axially opposite directions between retracted and extended positions thereof relative to base 10 operates through links 104 and 106 to respectively pivot gripping members 86 from the unreleased or holding positions thereof shown in FIG. 2 to the released positions thereof shown in FIG. 3 and thence back to the holding positions shown in FIG. 2. Mounting block 26 includes a recess 118 in the end thereof facing end 18 of base plate 16, and a spring 120 surrounds shaft 80 and has one end in recess 118 and its other end engaged against block 114, thus biasing shaft 80 to the right in FIGS. 2 and 3.

Figure 2:
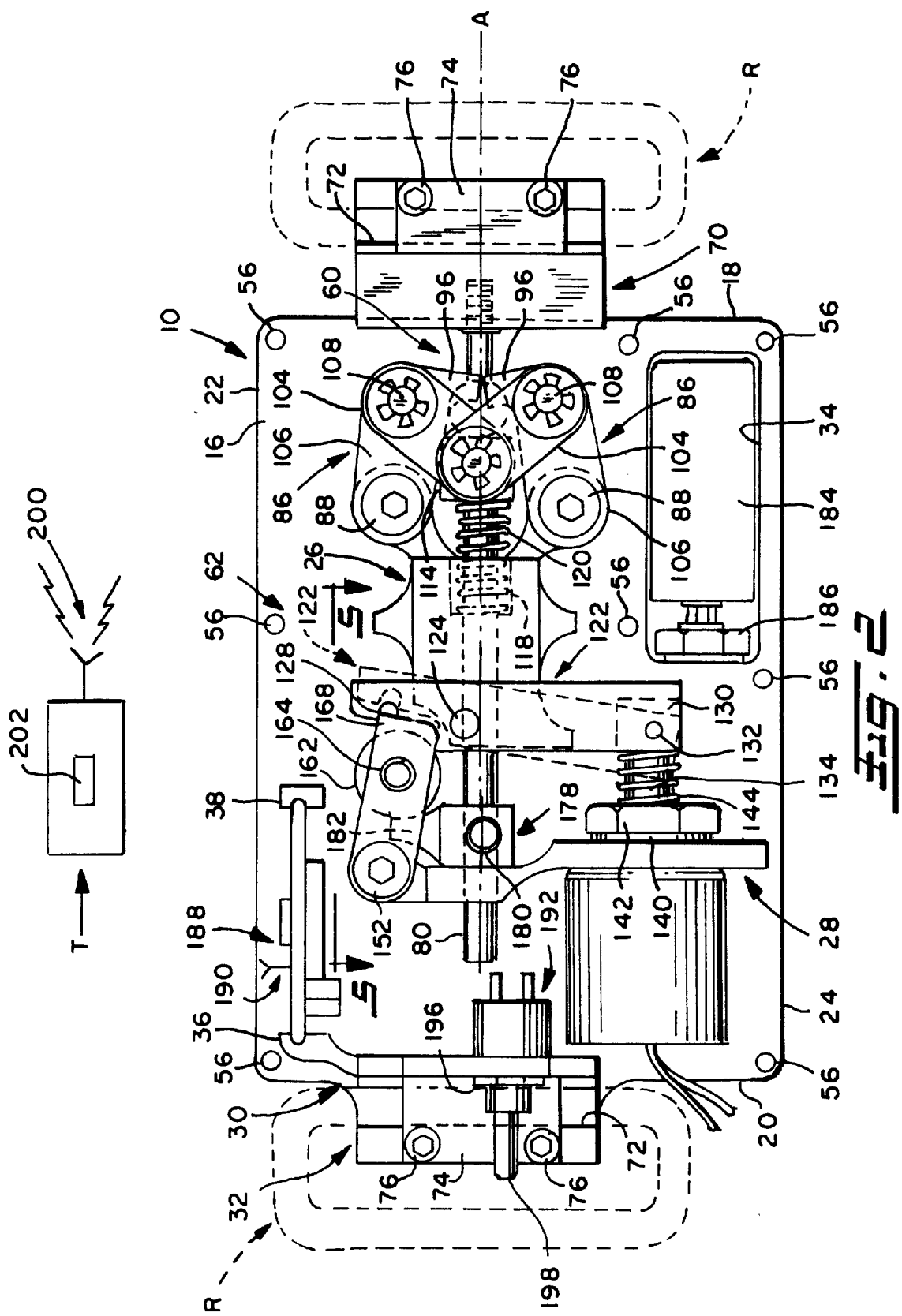
FIG. 2 is a plan view of the base and the component parts of the release mechanism in the unreleased condition thereof.

Release mechanism 62 further includes component parts mounted on base 10 for locking shaft 80 and thus gripping members 86 in the positions thereof shown in FIG. 2 and for selectively releasing the shaft for displacing the latter and the gripping members to the positions thereof shown in FIG. 3. More particularly in this respect, a kicker arm 122 of tool steel is pivotally supported on mounting block 26 by means of a pivot pin or stud 124 which is integral with the mounting block and extends through an opening therefor in the kicker arm, not designated numerically. Arm 122 has a latching end provided with a latching recess 126 having a latching edge 128, and an actuator end 130 pivotally interconnected by a pin 132 with the armature 134 of a 6 volt solenoid 136. Solenoid 136 has a mounting end extending through an opening 138 provided therefore in support 28 on base 10, and the solenoid is mounted on the latter by way of a lock washer 140 and a nut 142. A biasing spring 144 surrounds armature 134 between nut 142 and pin 132 and biases the solenoid armature stem to the unactuated position thereof shown in FIG. 3. The latching mechanism further includes a locking arm 146 of stainless steel which, as best seen in FIGS. 2, 3 and 5, includes an end 148 pivotally mounted on end 150 of support 28 by means of a pivot pin 152 which extends through an opening 154 therefor in end 148 and into a threaded opening 156 which extends through end 150 and the underlying portion of base plate 16. The locking arm further includes upper and lower arm portions 158 and 160, respectively, which are spaced apart to receive a roller element 162 therebetween and which is rotatably supported between the arm portions by a pin 164 having a lower end 166 extending below lower arm portion 160 for the purpose set forth hereinafter. Upper arm portion 158 has an outer latching end 168 which is adapted to be received in recess 126 and to engage against latching surface 128 when the component parts are in the unreleased position shown in FIG. 2. Locking arm 146 is biased to pivot clockwise from the position shown in FIG. 3 to the position shown in FIG. 2, in the manner set forth hereinafter, by a torsion spring 170 supported beneath the locking arm by a pin 172. Spring 170 has a leg 174 at one end engaging against the lower end 166 of pin 164 and a leg 176 at the other end engaging against end 150 of support 28. For the purpose set forth hereinafter, shaft 80 is provided with a cam member 178 which is mounted on the shaft for displacement therewith by a roll pin 180. Cam 178 has a camming finger 182 which is received between roller 162 and the mounting end of locking arm 146 and the side of which engages radially against the roller when the component parts are in the unreleased position shown in FIG. 2. The outermost end of cam finger 182 engages radially against the periphery of roller 162 when the component parts are in the released position shown in FIG. 3.

The remotely controlled release mechanism is powered by a 9 volt battery 184 which is received in the battery compartment of cover 12 and retained therein by battery cover 14, and the battery is connected to a standard 9 volt battery connector 186. A receiver 188 having an antenna 190 is mounted between receiver supporting fingers 36 and 38, and an on-off switch 192 is mounted on mounting plate 30. In this respect, a neck portion of the switch extends through an opening 194 in the mounting plate and a nut 196 is threaded onto the neck portion. The switch is adapted to be actuated by a push button plunger 198. While not shown, for purposes of clarity, it will be appreciated that battery connector 186 is connected to solenoid 136, receiver 188 and switch 192 through suitable wiring. Transmitter T, which is preferably a two-channel transmitter, includes an antenna 200 and a push button operating member 202 and, while not shown, it will be appreciated that the transmitter is powered by a battery in the housing thereof.

Assuming the component parts of the remotely operated release device to be in the released or unlatched positions thereof shown in FIG. 3, releasable member 60 is moved into recess 81 in the outer end of shaft 80 and is pushed axially inwardly thereagainst through the use of mounting block 70 to displace the shaft to the left in FIG. 3 and toward the latch or holding positions of the component parts shown in FIG. 2. As shaft 80 moves to the left in FIG. 3, cam 178 moves therewith, whereby finger 182 of the cam disengages roller 162 allowing torsion spring 170 to pivot locking arm 146 clockwise from the position shown in FIG. 3 to the position shown in FIG. 2 in which end 168 of the locking arm engages in recess 126 of kicker arm 122. As end 168 of the locking arm moves toward recess 126, kicker arm 122 pivots clockwise about pin 124 against the bias of solenoid spring 144. Movement of shaft 80 to the left in FIG. 3 compresses spring 120 whereby, when the component parts reach the positions shown in FIG. 2, locking arm 146 and kicker arm 122 interengage to hold the shaft against the bias of spring 120 which biases shaft 80 to the right in FIGS. 2 and 3. In the latched position of the component parts shown in FIG. 2, spherical head 64 of releasable member 60 is captured between spherical surface 81 on shaft 80 and spherical surfaces 102 of gripping members 86. Displacement of shaft 80 to the right is precluded by the latching arrangement, whereby the releasable member is securely held in place relative to the base of the device.

Presuming the strapping at opposite ends of the base to be wrapped around a bull, the control system is turned on in preparation for operation of the release mechanism by operation of on-off switch 192. In the event it becomes necessary to release the strapping, a remotely located person holding transmitter T depresses push button 202 thereof whereby a signal is transmitted from antenna 200 of the transmitter to antenna 190 of receiver 188 whereupon solenoid 136 is actuated to displace armature 134 thereof to the left in FIG. 2. Such displacement of the armature displaces kicker arm 122 from the solid line to the broken line position thereof shown in FIG. 2. As soon as kicker arm surface 128 disengages end 168 of locking arm 146, the force of biasing spring 120 moves shaft 80 and thus cam 178 to the right in FIG. 2, whereby cam finger 182 displaces locking arm 146 counterclockwise about pin 152 against the bias of torsion spring 170, thus to release shaft 80. When so released, shaft 80 operates through links 104 and 106 to pivot gripping members 86 about the corresponding pivot pin for fingers 96 thereof to move laterally outwardly from engagement with spherical head 64, thus releasing the latter and, therefore, the strap attached thereto. Movement of shaft 80 to the right is limited by engagement of cam 178 with the corresponding end of mounting block 26 and, preferably, spring 120 is still under compression at this point. The strength or force of spring 120 is such that releasable member 60 is literally propelled from the housing. To reload or relatch the releasable member, switch 192 is turned off and the releasable member is engaged with the outer end of shaft 80 and is pushed inwardly thereof as described.

While considerable emphasis has been placed herein on the structure and operation of the preferred embodiment, it will be appreciated that other embodiments of the invention can be made and that many changes can be made in the preferred embodiment without departing from the principles of the invention. In this respect, for example, the laterally opposite sides of the inner end of the releasable member could be arcuate rather than spherical and the surfaces of the fingers of the gripping members of like contour. Moreover, the ends of the gripping fingers could be convex and the releasable member could be provided with recesses for receiving the ends. Further, it will be appreciated that the solenoid and latching lever arrangement could be designed to be operable with a push-type solenoid rather than the pull-type disclosed herein. These and other modifications of the preferred embodiment will be obvious and suggested to those skilled in the art upon reading the disclosure herein, whereby it is to be distinctly understood that the foregoing description is to be interpreted merely as illustrative of the invention and not as a limitation.

Having thus described the invention, it is so claimed:

1. In a remotely operated release device comprising a support having an axis, a releasable member having an end, a release mechanism on said support having holding and released positions with respect to said end of said releasable member, a remote control signal transmitter, and means including a control signal receiver on said support for shifting said release mechanism from said holding to said released position in response to a control signal received from said transmitter, the improvement comprising: said release mechanism including a pair of gripping members mounted on said support on laterally opposite sides of said axis for displacement toward and away from said end of said releasable member between first and second positions with respect thereto, said gripping members in said holding and released positions of said release mechanism being respectively in said first and said second positions with respect to said end, each of said gripping members being mounted on said support for pivotal displacement about a corresponding pivot axis and having a finger displaceable toward and away from said end of said releasable member in response to displacement of the gripping member in opposite directions about its pivot axis, said release mechanism including means for pivoting said gripping members in said opposite directions, said means for pivoting said gripping members including a pair of links each having first and second ends, said first ends being pivotally connected to a different one of said gripping members between the pivot axis and finger thereof, a pin pivotally interconnecting said second ends together at a link axis transverse to and intersecting said axis of said support, means for displacing said pin in axially opposite directions with respect to said axis of said support, said means for displacing said pin in axially opposite directions including a shaft having a shaft end adjacent said end of said releasable member, said shaft being displaceable in axially opposite directions relative to said support, and said pin being attached to said shaft for displacement therewith.

2. The improvement according to claim 1, and a spring for biasing said shaft toward said end of said releasable member.

3. The improvement according to claim 1, wherein said end of said releasable member includes a convex spherical surface and said end of said shaft has a spherical recess corresponding in contour to said convex spherical surface.

4. The improvement according to claim 1, wherein said shaft has latched and unlatched positions respectively corresponding to said holding and released positions of said release mechanism, and latch means for releasably holding said shaft in said latched position.

5. The improvement according to claim 4, wherein said latch means has engaged and disengaged positions respectively corresponding to said latched and unlatched positions of said shaft.

6. The improvement according to claim 5, and actuating means for displacing said latch means from said engaged position to said disengaged position.

7. The improvement according to claim 6, wherein said actuating means includes electrically operated means responsive to said control signal received from said transmitter.

8. The improvement according to claim 7, wherein said electrically operated means includes a solenoid.

9. The improvement according to claim 7, and a spring for biasing said shaft toward said end of said reusable member.

10. The improvement according to claim 9, wherein said end of said releasable member includes a convex spherical surface and said end of said shaft has a spherical recess corresponding in contour to said spherical surface.

11. The improvement according to claim 10, wherein said electrically operated means includes a solenoid.

12. In a remotely operated release device comprising a support having an axis, a releasable member having an end, a release mechanism on said support having holding and released positions with respect to said end of said releasable member, a remote control signal transmitter, and means including a control signal receiver on said support for shifting said release mechanism from said holding to said released position in response to a control signal received from said transmitter, the improvement comprising: said release mechanism including a pair of gripping members mounted on said support on laterally opposite sides of said axis for pivotal displacement about a corresponding gripping member axis and having fingers for displacement toward and away from said end of said releasable member between first and second positions with respect thereto, said fingers in said holding and released positions of said release mechanism being respectively in said first and second positions with respect to said end, a shaft coaxial with said axis and having a shaft end adjacent said end of said releasable member, said shaft being displaceable in axially opposite directions relative to said support between retracted and extended positions respectively corresponding to said holding and released positions of said release mechanism, means interconnecting said gripping members and said shaft for displacement of said shaft from said retracted position to said extended position to displace said gripping members from said first to said second position with respect to said end of said releasable member, and holding means for releasably holding said shaft in said retracted position.

13. The improvement according to claim 12, wherein said holding means includes latch means having latched and unlatched conditions relative to said shaft, said latch means in said retracted position of said shaft being in said latched condition and in said extended position of said shaft being in said unlatched condition.

14. The improvement according to claim 13, and means responsive to said control signal from said transmitter for shifting said latch means from said latched to said unlatched condition.

15. The improvement according to claim 13, wherein said latch means includes a locking arm mounted on said support for pivotal displacement about a locking arm axis and having a latching end spaced from said locking arm axis, a kicker arm mounted on said support for pivotal displacement about a kicker arm axis and having a latching surface spaced from said kicker arm axis and engaging with said latching end of said looking arm in said latched condition, a cam on said shaft for displacement therewith and engaging with said locking arm in said latched condition to hold said shaft in said retracted position thereof, and means to displace said kicker arm about said kicker arm axis to disengage said latching surface from said latching end and said locking arm from said cam to release said shaft for displacement from said retracted to said extended position thereof.

16. The improvement according to claim 15, wherein said means for displacing said kicker arm includes an electrically operated solenoid.

17. The improvement according to claim 15, wherein said locking arm includes a roller rotatable about a roller axis parallel to said locking arm axis, said cam having a side radially engaging against said roller in said lateral condition.

18. The improvement according to claim 17, and said cam having an end spaced from said shaft and radially engaging said roller in said unlatched condition.

19. The improvement according to claim 15, and spring means for biasing said locking arm and said kicker arm toward said latched condition of said latch means.

20. The improvement according to claim 12, and a spring biasing said shaft in the direction from said retracted to said extended position thereof.

21. The improvement according to claim 12, wherein the fingers and said end of said releasable member,have interengaging recess and projection means in said holding position.

22. The improvement according to claim 21, said end of said releasable member includes projection means and said fingers include recess means receiving said projection means in said holding position.

23. The improvement according to claim 22, wherein said end of said releasable member is spherical and said recess means includes a recess in each finger having a spherical surface.

24. The improvement according to claim 12, wherein said means interconnecting said gripping members and said shaft includes a pair of links each having first and second ends, said first ends being pivotally connected to a different one of said gripping members between the pivot axis and finger thereof, and a pin pivotally interconnecting said second ends together and to said shaft for displacement therewith.

25. The improvement according to claim 24, wherein said holding means includes latch means having latched and unlatched conditions relative to said shaft, said latch means in said retracted position of said shaft being in said latched condition and in said extended position of said shaft being in said unlatched condition, said latch means including a locking arm mounted on said support for pivotal displacement about a locking arm axis and having a latching end spaced from said locking arm axis, a kicker arm mounted on said support for pivotal displacement about a kicker arm axis and having a latching surface spaced from said kicker arm axis and engaging with said latching end of said locking arm in said latched condition, a cam on said shaft for displacement therewith and engaging with said locking arm in said latched condition to hold said shaft in said retracted position thereof, and means for displacing said kicker arm about said kicker arm axis to disengage said latching surface from said latching end and said locking arm from said cam to release said shaft for displacement from said retracted to said extended position thereof.

26. The improvement according to claim 25, and a spring biasing said shaft in the direction from said retracted to said extended position thereof.

27. The improvement according to claim 26, wherein said end of said releasable member is spherical and each said finger has a spherical recess receiving said end in said holding position.

28. The improvement according to claim 27, wherein said locking arm includes a roller rotatable about a roller axis parallel to said locking arm axis, and said cam has a side radially engaging against said roller in said latched condition and an end spaced from said shaft and radially engaging said roller in said unlatched condition.

29. The improvement according to claim 28, and spring means for biasing said locking arm and said kicker arm toward said latched condition of said latch means.

30. The improvement according to claim 29, wherein said means for displacing said kicker arm includes an electrically operated solenoid.

31. The improvement according to claimed 30, wherein said shaft end has a spherical recess corresponding in contour to the spherical end of said releasable member.

* * * * *